Feb. 4, 1941.  A. GROSSFELD ET AL  2,230,489
SQUEEGEE
Filed Sept. 16, 1938
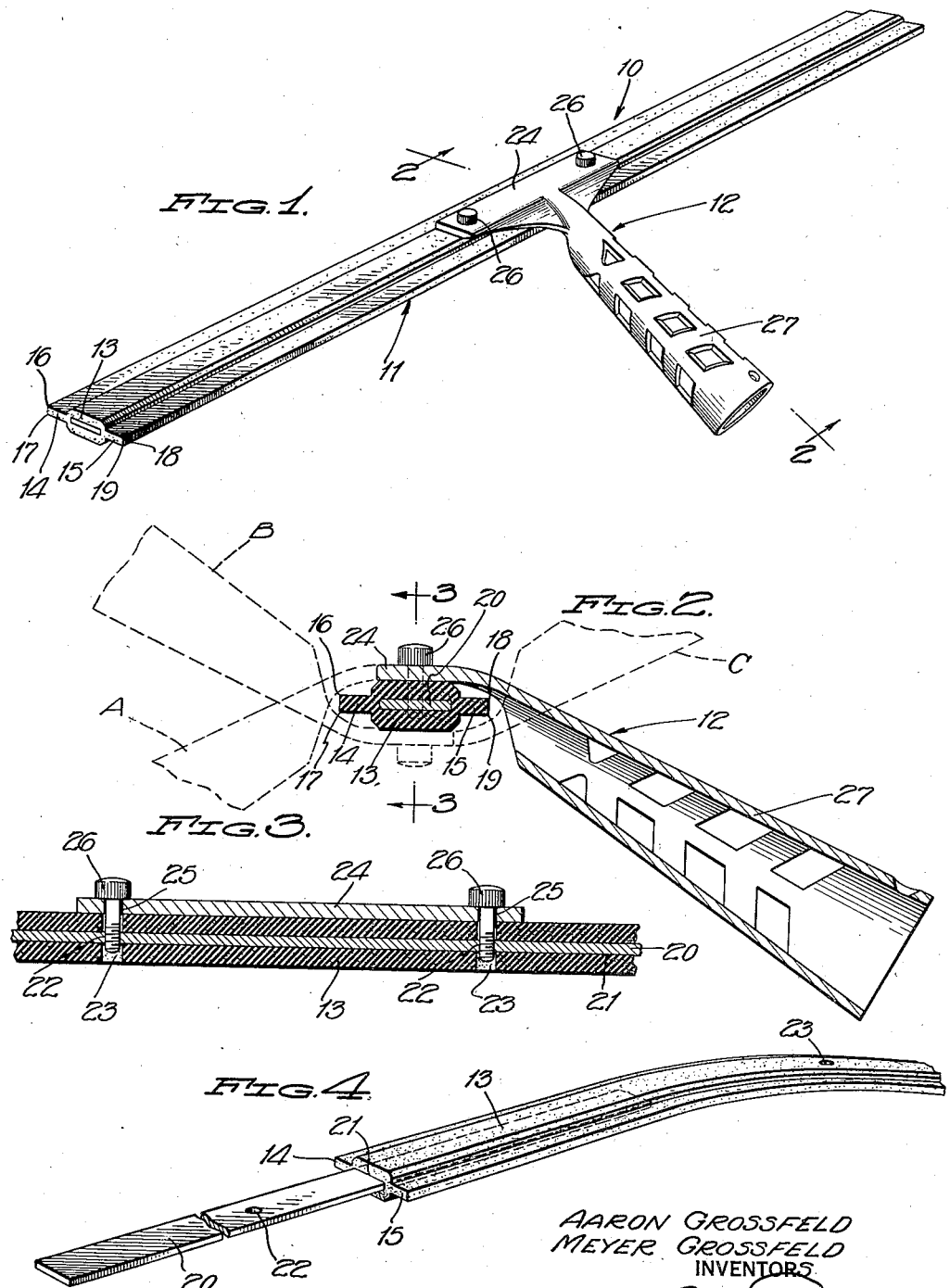
AARON GROSSFELD
MEYER GROSSFELD
INVENTORS
BY Ely Pattison
ATTORNEYS Patented Feb. 4, 1941

2,230,489

UNITED STATES PATENT OFFICE 2,230,489

SQUEEGEE

Aaron Grossfeld and Meyer Grossfeld, New York, N. Y., assignors to The Forway Squeege Manufacturing Co., Inc., New York, N. Y., a corporation of New York Application September 16, 1938, Serial No. 230,193

4 Claims. (Cl. 15—245)

This invention relates to improvements in squeegees.

The primary object of the invention resides in a squeegee having a wiping blade provided with a multiplicity of straight wiping edges, and a handle member which may be connected to the blade in various positions so as to selectively position the wiping edges for use relative to the handle member. By this novel construction, the several wiping edges may be successively brought into use as they become worn, thus imparting longer life to the wiper blade.

Another feature of the invention is to provide a squeegee in which the handle member may be detached from the wiping blade, reversed, and again connected therewith in a relatively short period of time without the aid of a screw driver or other tool.

A further object of the invention is the provision of a squeegee in which the wiping blade is formed of a flexible strip of flat tubular rubber having wiping flanges integral therewith and extending from opposite sides thereof, the same being molded or extruded in a single piece, whereby a rigid stiffening bar may be inserted into the rubber strip to render the body of the strip rigid while the wiping flanges remain flexible.

A still further object of the invention is to provide a squeegee having the above mentioned features which is simple in construction, inexpensive of manufacture, and which resembles in appearance, and weight, the conventional squeegee with which window cleaners are familiar.

Other features of the invention will be apparent as the following specification is read in conjunction with the accompanying drawing, in which:

Figure 1 is a perspective view of the invention.

Figure 2 is an enlarged vertical sectional view on the line 2—2 of Figure 1, the dotted lines indicating the various positions at which the handle may be set relative to the wiping edges of the squeegee blade.

Figure 3 is a fragmentary vertical longitudinal sectional view on the line 3—3 of Figure 2.

Figure 4 is a detail perspective view illustrating the manner in which the stiffening rod is inserted into the rubber wiping strip.

Referring to the drawing by reference characters, the numeral 10 designates the improved squeegee in its entirety which includes generally a wiping blade 11 and a detachable handle 12.

The wiping blade 11 comprises a relatively flat tubular body 13 of flexible rubber of a length determined by the length of the blade desired.

Formed integral with the tubular rubber body 13 and extending from opposite sides thereof are flexible rubber flanges 14 and 15 which extend the length of the body. The free edges of the flanges 14 and 15 are straight and the flange 14 has two wiping corner edges 16 and 17, and the flange 15 has two like wiping corner edges 18 and 19, any one of which may be selectively brought into position for use relative to the handle member 12 in a manner to be described.

The flexible rubber strip from which the tubular body 13 and flanges 14 and 15 are formed may be molded or extruded and the texture of the rubber forming the body and flanges is the same. The rubber strip is incapable of sustaining itself without bending as illustrated in Figure 4 of the drawing, therefore the tubular body 13 is made rigid by the insertion of a flat metal bar 20 thereinto. The bar 20 and body 13 are of the same length so that the body is stiffened throughout its entire length. The bar 20 is slightly larger in cross sectional area than the rectangular passage 21 in the tubular body 13 so that the body is slightly distended when the bar is inserted thereinto to cause the walls of the passage to grip the bar and prevent accidental shifting of the same relative to the body.

The bar 20 is provided with a pair of threaded openings 22, the same being equidistantly spaced from the mid portion of the bar and which register with openings 23 which extend inwardly from opposite sides of the tubular body 13.

The handle member 12 comprises a flat attaching plate 24 having spaced openings 25 therein which repectively register with the pairs of openings 22 and 23. Knurl headed screws 26 pass through the openings 25 and 23, and thread into the opening 22 to secure the plate 24 flat against either of the flat sides of the body 13. A hollow hand grip element 27 is integral with the plate 24 and extends angularly therefrom and by which the squeegee is held during use of the same.

In Figures 1 to 3 of the drawing, the handle element 12 is shown attached to that flat side of the blade 11 for use of the wiping corner edge 17 of the flange 14, the handle element 12 extending beyond the flange 15. In use of the squeegee, the wiping edges soon become worn or accidentally nicked which renders the same useless, but by the changing of the handle member 12 relative to the wiping corner edges of the blade, it is possible to selectively and successively bring the other wiping corner edges 16, 18, and 19 into position of use relative to the handle member 12. To bring the wiping edge 19 into use, the handle member 12 is separated from the blade by removing the screws 26, and reversing the handle member 12 to the dotted position A, the same being clamped against the same flat side of the blade as previously. However, should it be desired to bring the wiping edge 18 into use the handle member 12 is attached to the reverse flat side of the blade and secured in the dotted position B. To position the remaining wiping edge 16 into use, the handle member 12 is attached to the blade 11 as indicated by the dotted position C. Thus by reversing the position of the handle member relative to the wiping edges of the blade, any wiping edge may be brought into position for use. The attaching means is simple to manipulate for it is only necessary to manually remove and replace the screws 26 when clamping the handle member from one of its four positions to another.

While we have shown the tubular body 13 and bar 20 as being flat, the same may be other shapes in cross section such as oval. Also reversible blades 11 may be constructed for uses other than for hand squeegees, such as for windshield wiper purposes, if desired.

While we have shown what we consider to be the preferred embodiment of our invention it will be understood that such changes in construction as come within the scope of the appended claims may be resorted to if desired without in any way departing from the spirit of the invention.

Having thus described the invention, what we claim as new and desire to secure by Letters Patent of the United States, is:

1. A squeegee comprising in combination, a wiping blade including a flat tubular flexible rubber body, a rigid bar disposed within said body for stiffening the same, flexible wiping flanges integral with and extending one from each side of said body, a pair of spaced threaded openings provided in said bar, said rubber body having a pair of openings registering with the threaded openings, a handle member including a flat plate fitting against one of the flat sides of said body and having spaced openings therein in register with the openings in said body and said bar, headed screws passing through the openings in said plate and body and having threaded engagement with the threaded openings in said bar to rigidly clamp said plate to said wiping blade, and a hand grip portion extending angularly from said plate.

2. A glass wiping implement comprising a handle member, coupling means engaging with the handle member, a flat tubular flexible body open at its opposite ends, a flat rigid bar member insertable through either end of said body and snugly fitting therein to stiffen the flexible body, spaced flexible wiping flanges integral with the body, and means intermediate the spaced flanges and substantially within the confines of the opposed surfaces of the bar member and detachably connected with the coupling means whereby to provide a rigid detachable connection between the members.

3. A glass wiping implement comprising a handle member; a flat elongated tubular flexible body open at its opposite ends; an elongated rigid flat bar member insertable through either end of said body and snugly fitting therein to stiffen the flexible body; a flexible wiping flange integral with one side of the body; another side of said flexible body disposed between the two members; coupling means engageable with one member; and means carried by the other member, coacting with the coupling means, and the coupling means extending through said other side of the body whereby to provide a rigid detachable connection securing the members together and also clamping the said other side between the members.

4. A glass wiping implement for manual operation controlled by the will of the operator comprising an elongated rigid core member; an elongated flexible body surrounding the core member between the ends thereof in gripping relation; a flexible wiping flange on one side of the flexible body extending longitudinally thereof; a handle; an extension member on the handle positioned against one confronting side only of the flexible body adjacent the wiping flange; and a coupling engaging one member, detachably connected with the other member, and passing through said confronting side only of the flexible body thereby clamping the members and confronting side of the flexible body together in detachable rigid relation.

AARON GROSSFELD.
MEYER GROSSFELD.